United States Patent
Kocik et al.

(10) Patent No.: US 8,093,531 B2
(45) Date of Patent: Jan. 10, 2012

(54) METHOD OF ENERGY BEAM WELDING ALUMINUM TO TITANIUM

(75) Inventors: Rainer Kocik, Bremen (DE); Joerg Schumacher, Kirchlinteln (DE); Sebastian Kaschel, Bremen (DE); Michael Kreimeyer, Stuhr-Moordeich (DE); Frank Vollertsen, Bremen (DE)

(73) Assignee: Airbus Deutschland GmbH (DE)

( * ) Notice: Subject to any disclaimer, the term of this patent is extended or adjusted under 35 U.S.C. 154(b) by 84 days.

(21) Appl. No.: 12/319,785

(22) Filed: Jan. 12, 2009

(65) Prior Publication Data

US 2009/0145886 A1 Jun. 11, 2009

Related U.S. Application Data

(62) Division of application No. 11/136,778, filed on May 25, 2005, now abandoned.

(60) Provisional application No. 60/598,272, filed on Aug. 3, 2004.

(30) Foreign Application Priority Data

May 28, 2004 (DE) .......................... 10 2004 026 228

(51) Int. Cl.
*B23K 26/32* (2006.01)
*B23K 15/00* (2006.01)

(52) U.S. Cl. ........... 219/121.64; 219/121.14; 228/262.5; 228/262.71

(58) Field of Classification Search ............. 219/121.64, 219/121.14, 121.66; 228/262.5, 262.51, 228/262.71, 262.72
See application file for complete search history.

(56) References Cited

U.S. PATENT DOCUMENTS

| | | | | |
|---|---|---|---|---|
| 2,761,047 A * | 8/1956 | Meredith | ...... | 219/118 |
| 4,486,647 A * | 12/1984 | Kuusinen et al. | ..... | 219/137 WM |
| 4,714,815 A * | 12/1987 | Swarts et al. | ........... | 219/121.63 |
| 4,990,741 A * | 2/1991 | Moores et al. | ........... | 219/121.64 |
| 5,809,647 A * | 9/1998 | Wagner et al. | ........... | 29/890.048 |
| 7,100,885 B2 * | 9/2006 | Zerner | ........ | 248/503.1 |
| 7,207,756 B2 | 4/2007 | Vichniakov et al. | | |
| 7,841,507 B2 * | 11/2010 | Kempa et al. | ........... | 228/262.51 |
| 2004/0169019 A1* | 9/2004 | Hildebrandt | ............. | 219/121.14 |
| 2005/0133666 A1* | 6/2005 | Zerner | ........ | 244/118.6 |
| 2005/0258218 A1* | 11/2005 | Schmaranzer et al. | .... | 228/262.5 |
| 2006/0292392 A1 | 12/2006 | Froning et al. | | |
| 2008/0128550 A1 | 6/2008 | Roming et al. | | |

FOREIGN PATENT DOCUMENTS

DE 20112023 U1 4/2002
(Continued)

OTHER PUBLICATIONS

Fuji, A.; Ameyama, K.; North, T.H.: "Influence of silicon in aluminum on the mechanical properties of titanium/aluminum friction joints,"in: Journal of material science, vol. 30, booklet 20, pp. 5185-5191, Dec. 1995.

(Continued)

*Primary Examiner* — Geoffrey S Evans
(74) *Attorney, Agent, or Firm* — Lerner, David, Littenberg, Krumholz & Mentlik, LLP

(57) ABSTRACT

A joining of a titanium material with an aluminium material, wherein the parts made of the two substances are connected with each other in a substance-to-substance manner. Preferably, the joining is effected by a laser beam or an electron beam.

6 Claims, 4 Drawing Sheets

FOREIGN PATENT DOCUMENTS

GB    2320183        6/1998
GB    2 321 626 A    8/1998

OTHER PUBLICATIONS

Fuji, A.; Ameyama, K.; North, T.H.; Kimura, M.; Aki, M.: "Mechanical properties of Titanium—5083 aluminum alloy friction joints"; in: Materials science technology; vol. 13, booklet 8, pp. 673-678, Dec. 1997.

Holler, M.; Meier, H.: "Beitrag zu den Unterscuhungen der Autogenverbindungen mit anderen Metallen", Autogene Metallverarbeitung, 28, 12, pp. 177-18, Dec. 1935.

Dupak et al., "Application of a New Electron Beam Welding Technology in Vacuum Equipment Design," Kovine, zlitine, technologije/ letnik 29, St. 3-4, 431-432, Dec. 1995.

"Titan kann mit Aluminium nimmt dunne Kupferlagen and ultraschallbehandeltes Lot," Blick durch die Wissenschaft—insert of the Frankfurter Allgemeine Zeitung, vol. 36, booklet 150, p. 8, Dec. 1993.

Skoda, P. "Creation of heterogenien weld joints of titanium and aluminum based materials by electron beam welding," welding science and technology; Japan, Slocak; Welding Symposaium; Tatranske Matliare, S. 157-161, Dec. 1996.

Kreimeyer M.: "Fugen von Aluminiumlegierungen mit Titan unter Verwendung eines Nd: YAG-Lasersystems." LaserOpto, vol. 33, Nr. 1, S. 31-33, Dec. 2001.

Schubert et al., "Laser Beam Joining of Material Combinations for Automotive Applications," Proceedings of the Spie, Jun. 1997, vol. 3097, 212-221.

Kreimer, M., et al., "Laser Processing of Aluminim-Titanium-Tailored Blanks," Optics and Lasers in Engineering, Feb. 9, 2005, 102-1035.

Katayama, S., "Laser Welding of Aluminium Alloys and Dissimilar Metals," Welding International, Aug. 1, 2004, 618-625.

Esposito, Tony—Abstract for "Extruded titanium for seat tracks" (Aerospace Engineering (Aug. 1997), vol. 17, No. 8 1-2 2, ¶. 15-16). One page.

Silk, John—"Titanium Extrusions for Aerostructures", Aerospace Online, Oct. 24, 2001, 5 pages.

Ege et al., "Stability of interfaces in explosively-welded aluminum titanium laminates," Mexico Tech, Socorro, USA, Journal of Materials Science Letters 19, pp. 1533-1535 (Before May 28, 2004).

Kreimeyer, M; Wagner, F.; Zerner, I., Sepold, G.: "Laser beam joining of Aluminium with titanium with the use of an adapted working head." pp. 317-321, (Before May 28, 2004).

Kreimeyer, M., et al., "Laser Processing of Aluminim-Titanium-Tailored Blanks," Optics and Lasers In Engineering, Feb. 9, 2005, 1021-1035.

* cited by examiner

METHOD OF ENERGY BEAM WELDING ALUMINUM TO TITANIUM

CROSS-REFERENCE TO RELATED APPLICATIONS

This application is a divisional of U.S. application Ser. No. 11/136,778, filed on May 25, 2005, which claims the benefit of U.S. Provisional Patent Application No. 60/598,272 filed Aug. 3, 2004, the disclosures of which are incorporated herein by reference.

BACKGROUND OF THE INVENTION

The present invention relates to the joining of aluminium and titan components. In particular, the present invention relates to a component e.g. for an aircraft, and to a method for connecting a first region of a titanium material and a second region of an aluminium material for forming a component, for example for an airplane.

In the following, the field of the invention is further described with respect to material technology, processing technology and application technology:

Concerning Material Technology:

The thermal joining of different materials is published, since 1935, for example, in Holler, M.; Meier, H.: "Beitrag zu den Untersuchungen der Autogenverbindungen mit anderen Metallen", Autogene Metallverarbeitung, 28, 1935, 12, pages 177-18, which hereby is incorporated by reference, such joining technologies mentioned in the literature mostly have a double nature, which means: for the low temperature melting materials, a welding process takes place, since they are melted-up. In these processes, the joining temperature is adjusted in such a way that for the joining partners which melt at higher temperatures, there takes place a soldering process. For the moment of joining, differing temperature conductivities, melting points and solubilities of the materials are of special importance. The substance-to-substance or integral connecting of the metals is effected by means of process related diffusion processes which are determined by temperature and time. In this context, in the connection region, there arise more or less pronounced inter-metallic phase borders. Many interesting matchings of alloys show great differences with respect to melting point and thermal conductivity, which can be problematic while joining by means of conventional welding procedures like WIG, MIG or E-Hand, and can lead to formation of cracks.

Concerning Processing Technology:

Dupak et al., Applications of a New Electron Beam Welding Technology in Vacuum Equipment Design 2000, which is hereby incorporated by reference, introduces an electron beam welding procedure, by means of which aluminium can be joined, for example, with copper, nickel, silver and steal. At first, the joint region is heated with a defocused laser beam as far as just below the melting temperature of the low temperature melting material. Afterwards, the low temperature melting material is melted-up by means of a focused laser beam, so that this can wet the material which melts at higher temperatures. The procedure is limited to rotationally symmetric components. In this way, Dupak intends to produce joints, which are mechanically resistant and are suitable for applications in the vacuum technology. Two successive electron beam joining processes are necessary one after another, in order to ensure a reliant joint between the materials. The expenditure of time and costs for the joining procedure is great.

N.N.: "Titan kann mit Aluminium verbunden werden. Nippon-Aluminium nimmt dunne Kupferlagen und ultraschall-behandeltes Lot". Blick durch die Wirtschaft-insert of the Frankfurter Allgemeine Zeitung, vol. 36 (1993), booklet 150, p. 8, which is hereby incorporated by reference, describes a soldering method, which enables a production of sheet plates and formed parts of titanium and aluminium. During the process flow for the production of connections of such kind, copper plated titanium is applied. A zinc-aluminium solder is used as solder material. The solder is applied to the titanium and is temporarily subjected to an ultrasonic treatment. Subsequently, the aluminium part or sheet plate to be connected to is brought into close contact to the solder melted at the titanium-side. The connecting of both metals subsequently is effected by means of an anew ultrasonic heating-up.

Another procedure was disclosed in Suoda the "Creation of heterogenian weld joints of titanium and aluminium based materials by electron beam welding", Welding science and technology; Japan, Slovak; Welding Symposium, Tatranske Matliare, 1996, S. 157-161, which is hereby incorporated by reference. The application of an electron beam welding is described in the context of this publication. It was the aim of the work of Suoda, by means of the application of the electron beam, to produce an Al—Ti mixed crystal instead of inter-metallic phases. At the same time, the electron beam is temporarily exclusively directed onto the boundary layer of the low-temperature melting aluminium, so that the titanium, which melts at a higher temperature, is dissolved in the melting film. The experiments were carried out at high-vacuum. However, the analysis of the weld seams showed that the aimed at target could not be achieved: cracks and inter-metallic phases emerged at the boundary surfaces.

Fuji, A.; Ameyama, K.; North, T. H.: "Influence of silicon in aluminium on the mechanical properties of titanium/aluminium friction joints." In: Journal of Materials Science, 1995, volume 30, booklet 20, pages 5185-5191 and Fuji, A.; Kimura, M.; North, T. H.; Ameyama, K.; Aki, M.: "Mechanical properties of titanium-5083 aluminium alloy friction joints." In: Materials Science and Technology, 1997, volume 13, booklet 8, pages 673-678, which are both hereby incorporated by reference, concern the compound Ti—Al, considering the effects caused by silicon on the friction welding with subsequent heat treatment. The ductility of the compound is deemed to suffer from the creation of $TiAl_3$ in the phase transition. The creation of $TiAl_3$ can be reduced by means of silicon fractions within the aluminium base-alloy. It is assumed that silicon separations act as a barrier for a diffusion process.

A further procedure, which is hereby incorporated by reference, was published in N.N: Department of Materials and Metallurgical Engineering: "Stability of interfaces in explosively-welded aluminium-Titanium laminates", New Mexico Tech, Socorro, USA, Journal of Materials Science Letters 19, Pages 1533-1535. Here, aluminium and titanium were connected with each other by means of explosive welding, in order to develop applications for the lightweight construction.

Concerning Application Technology

The Boeing company employs rod-extruded titanium seat rails in ranges, in which added corrosion is located with seat rails made of aluminium. Such seat rails could also be manufactured by means of rod-extrusion technology or welding.

The solutions described above are believed to have the following disadvantages:

Concerning Processing Technology

Narrow process barriers (for example application only in the area of 1) sheet plates, 2) to linear, plane or rotationally symmetric components)

High process costs or manufacturing costs

Bad or no possibilities for repair welding

Concerning Application Technology

On the one hand, seat rails made of titanium solve the corrosion problem at seat rails made of aluminium, which causes high maintenance costs for the airlines. On the other hand, this solution is believed to have the disadvantage that the costs of acquisition and the component weight of these seat rails, as compared to seat rails made of aluminium, are considerably higher.

SUMMARY OF THE INVENTION

According to an exemplary embodiment of the present invention, a component, for example for an aircraft, is provided, having a first region made from a titanium material and a second region made from an aluminium material. The first region and the second region are bonded to each other in a substance-to-substance manner, whereby an integral component is provided in a hybrid mode of construction. Particularly, the corrosion resistance of the titanium is combined with the light weight and the cost efficiency of the aluminium.

According to a further exemplary embodiment of the present invention, the first and second region are connected in a substance-to-substance manner by means of a heat conduction welding process in the aluminium material of the second region. Heat is thereby applied to the aluminium material and the titanium material. This may, for example, be carried out by means of a defocused laser beam or electron beam, which irradiates a proximity of the regions to be joined and/or regions of the aluminium and of the titanium at both sides of the joint position. The two-dimensional heat impact, on the one hand, can effect the melting-up of the low-temperature melting aluminium (and a material reservoir, which may be arranged at either side or both sides, respectively). Due to the applied heat, the surface of the titanium is activated, so that the melted-on aluminium material may wet the titanium. The substance-to-substance connection between the two materials is then formed by means of diffusion.

According to a further exemplary embodiment of the present invention, the first and second regions are connected in a substance-to-substance manner, by means of an in-depth or deep welding process taking place in the aluminium material of the second region, in combination with a diffusion process caused by a heat flow towards the titanium material. The heat insertion effects the melting-on of the low-temperature melting aluminium material (or the material reservoir). By means of heat conduction, the surface of the titanium is activated, so that the melted-up aluminium material wets the titanium. The substance-to-substance connection between the two materials is generated by means of diffusion. It may thereby sufficient, by means of a laser beam or an electron beam, to provide a heat supply onto the aluminium material only. Thus, it may be sufficient to focus a laser beam or an electron beam onto the aluminium.

According to another exemplary embodiment of the present invention, the component is a seat rail for a seat of an airplane. Particularly, this may allow for a combination, for example, of the corrosion resistance of titanium with the favourable costs and the light weight of the aluminium. Thus, in particular in areas in danger of corrosion, titanium can be applied onto an aluminium support structure. In a hybrid manner, this construction in my be advantageous for the aircraft construction, where small weight, but also corrosion resistance is important. For example, regarding the seat rail for a flight passenger seat, the cost-intensive titanium can be limited to the seat rail crest, and the support structure or the base construction of the rail, respectively, can be formed by means of aluminium.

BRIEF DESCRIPTION OF THE DRAWINGS

In the following, with reference to the accompanying figures, preferred exemplary embodiments of the present invention are described.

DETAILED DESCRIPTION

Figure 1:
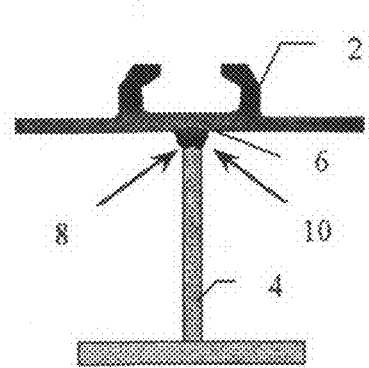
FIG. 1 shows a cross sectional view of a first exemplary embodiment of a seat rail for a passenger seat of an aircraft, which is manufactured in accordance with a method according to an exemplary embodiment of the present invention.

In the following description of FIGS. 1 to 7, the same reference numerals are used for equal or corresponding elements.

FIG. 1 shows a first exemplary embodiment of a seat rail according to the present invention in sectional view. The seat rail comprises a seat rail crest 2, which is formed of a titanium material, and a support structure 4 of an aluminium material. Seat rails of such kind are used, in order to mount passenger seats in an airplane. The seat rail crest 2 and the support structure 4, at one location or region 6, are connected with one another in a substance-to-substance manner. The compound shown in FIG. 1 illustrates an abutting connection of T-form. As will be described in the following in further detail, the compound between the seat rail crest 2 and the support structure 4 is generated by means of diffusion. For thermal joining of the seat rail crest 2 and the support structure 4, heat is supplied to location 6, as indicated by the arrows, which are referred to by the reference numerals 8 and 10.

It is principally possible, to supply the heat in such a way that the heat is supplied to the seat rail crest 2 as well as to the support structure 4. However, it is possible as well, as will be described in further detail in the following, to restrict the heat supply to the aluminium material of support structure 4 only, and not to supply direct heat to the seat rail crest 2. Applying heat to the seat rail crest 2 and the support structure 4, on the one hand effects the melting-on of the at low-temperature melting aluminium material or of a material out of a material pool, which may be arranged on both sides or on one side. Due to the supplied heat, the surface of the titanium is activated, so that the melted-up aluminium material wets the titanium. The substance-to-substance compound between the two materials is then generated by means of diffusion. In addition, a region about the point 6 with a locally inert gas protection with argon and/or helium can be used. This gas protection my be advantageous, since titanium at higher temperatures shows a high affinity towards atmospheric gases, which could lead to unwanted procedures of diffusion and connecting. Further, by applying such a gas protection, a material embrittlement of the titanium can be avoided. For applying the heat, for example, a BIAS-laser processing head having an integrated gas protecting unit may be used, as, for example, described in the German utility model DE 2901 12 023.3, which is hereby incorporated by reference.

As it already has been indicated before, it can be sufficient to apply only one heat insertion onto the support structure 4. Thus, an deep welding process running in the aluminium is created, in combination with a diffusion process initiated by the heat flow directed towards the titanium, which, in a substance-to-substance manner, connects the seat rail crest 2 with the support structure 4.

As is illustrated in FIG. 1, the support structure 4 is mounted to the seat rail crest 2 by means of an abutting joint of T-form here. In other words, a web of the support structure 4 is mounted at a surface of the seat rail crest 2.

Figure 2:
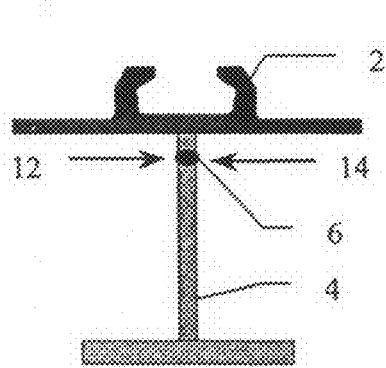
FIG. 2 shows a cross sectional view of a second exemplary embodiment of a seat rail according to the present invention, which is manufactured in accordance with a method according to an exemplary embodiment of the present invention.

FIG. 2 shows a schematic sectional view of a second exemplary embodiment of a seat rail according to the present invention.

As can be seen in FIG. 2, the support structure 4 is mounted by means of an abutting joint of I-form or profile at the seat rail crest 2. For this purpose, the seat rail crest 2 shows a web or bar, which, according to the present invention, is welded end-to-end with a web of the support structure 4. As illustrated in FIG. 2, for example, heat energy may be applied onto the two welding positions at a right angle. This is illustrated in FIG. 2 by means of arrows 12 and 14. However, it can be sufficient, to apply heat energy only from one side. As already has been indicated before, the heat energy may, for example, be applied by means of an electron beam or a laser beam. As is further described later with reference to FIGS. 3 to 5, the laser beam or electron beam may be focused or also be defocused.

As it can be seen from FIGS. 1 and 2, an angle, which is directed to the joint in a focused or defocused manner, like, for example, a laser beam or electron beam, may be adjusted, i.e. it may for example be perpendicular with respect to the web of the support structure 4, or at a certain angle with respect to the surface of the seat rail crest 2 (FIG. 1).

Figure 3:
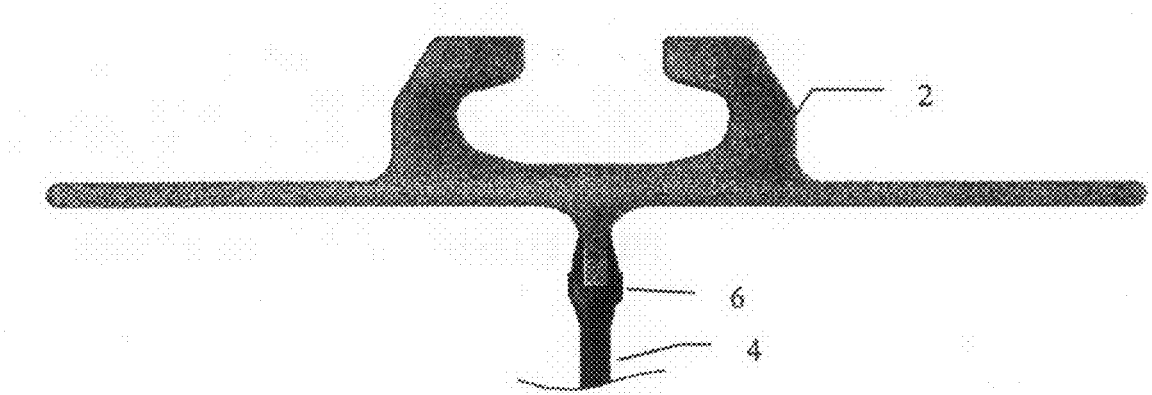
FIG. 3 shows a cross sectional view of a section of a third exemplary embodiment of a seat rail according to the present invention, which is manufactured in accordance with a method according to an exemplary embodiment of the present invention.

FIG. 3 illustrates a sectional view in detail of a seat rail according to a further advantageous exemplary embodiment of the present invention. As it can be seen from FIG. 3, the seat rail crest 2 and the support structure 4 are connected with one another by means of a end-to-end connection of I-form. For this purpose, the seat rail crest 2 has a web 18. The support structure 4 has a local thickening 20, into which a groove 24 is worked in, the dimension of which corresponds to the dimension of the web 18. The web 18 is inserted into the groove 24. The thickening 20 serves as material pool for the joining process.

According to the present invention, heat my be applied from both sides onto areas at both sides of the joint position. For this purpose, as illustrated with the reference numerals 12 and 14, a defocused laser beam may be directed onto the joint position in such a way that areas of the titanium material of the seat rail crest 2, and of the aluminium material of the support structure 4 are heated. The titanium and aluminium materials are then connected with one another, in a substance-to-substance manner, by means of the thermal conduction welding process, which is proceeding in the aluminium. The two-dimensional heat supply on the one hand effects the melting-up of the at low temperature melting aluminium of the support structure or of the material pool, respectively, which is formed by the thickening 20. Due to the supplied heat, the surface of the titanium is activated, so that the melted aluminium material wets the titanium material. The substance-to-substance compound between the two materials then evolves from diffusion. By means of this joining process, aluminium material is deposited in ranges around the joint position on the titanium material of the seat rail crest 2, as marked by the reference numeral 22 in FIG. 3.

The groove 24 my advantageously enables an easy reception of the titanium part, and in an advantageous manner allows for a favourable ability of positioning of the two joining partners.

Figure 4:
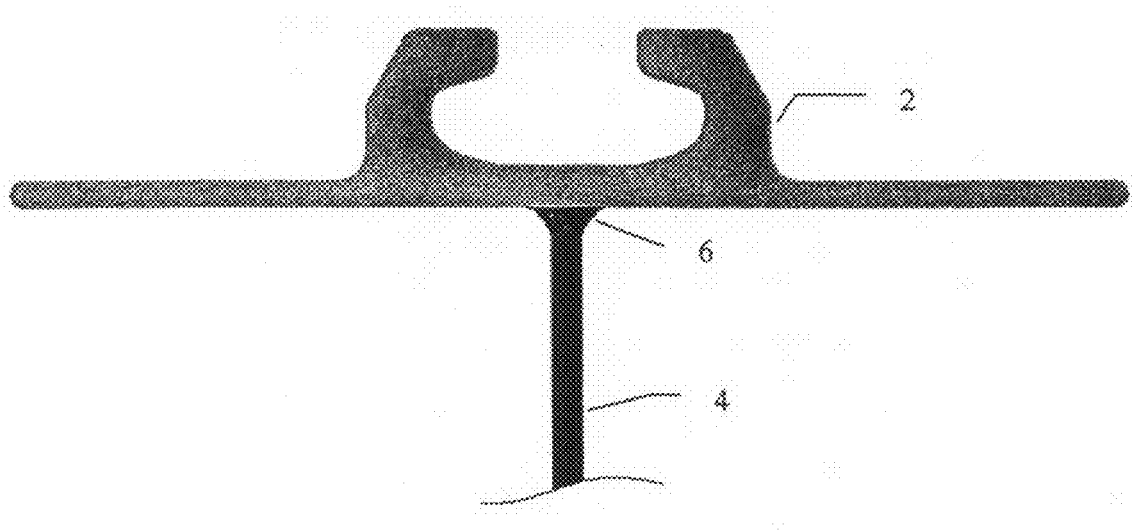
FIG. 4 shows a cross sectional view of a section of a fourth exemplary embodiment of a seat rail according to the present invention, which is manufactured in accordance with a method according to an exemplary embodiment of the present invention.

FIG. 4 shows another sectional view of a further exemplary embodiment of a seat rail according to the present invention. In the exemplary embodiment of FIG. 4, an additional material 32 is used. The additional material 32 used in FIG. 4 can be formed in strip form. As is illustrated in FIG. 1, such a joining in T-form of the titanium seat rail crest 2 with the support structure 4 can also be completed without using the additional material 32.

As it can be seen from FIG. 4, focused laser beams or electron beams 40 and 42 are directed onto the joint position at both sides of the support structure 4. The laser beams or electron beams 40 and 42 exhibit, for example, an angle α with respect to the lower surface of the seat rail crest 2.

The laser beams or electron beams, which, are brought into the aluminium sheet of the support structure 4, focussed by the angle of incidence α cause the melting-up of the at low temperature melting aluminium material and/or of the additional material 32. In this case, it may be sufficient, to limit the direct supply of heat by means of the laser beam onto the support structure, i.e. onto the aluminium. No direct insertion of heat by means of laser beam or electron beam to the titanium is necessary then. Due to heat conduction from the aluminium to the titanium, the surface of the titanium of the seat rail crest 2 is activated, so that the melted-up aluminium material can wetten the titanium material. The substance-to-substance connection between the two materials then evolves from diffusion. The use of the additional material 32 advantageously makes it possible that mainly material of the additional material is used for joining, and few material of the support structure is used for the joining connection.

Figure 5:
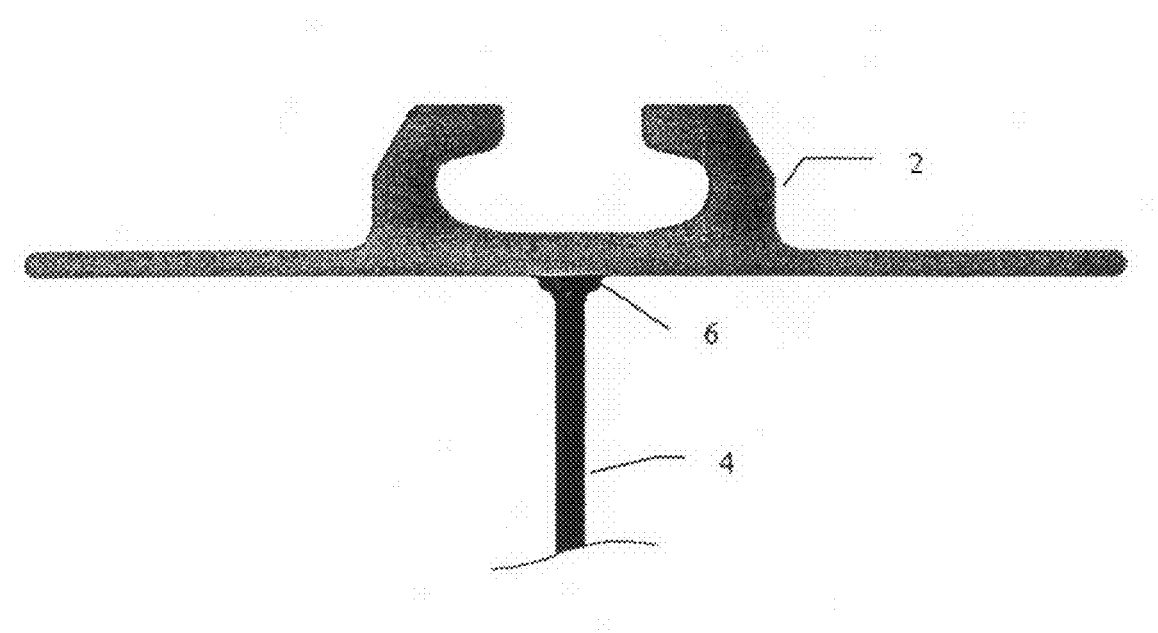
FIG. 5 shows a cross sectional view of a fifth exemplary embodiment of a seat rail according to the present invention, which is manufactured in accordance with a method according to an exemplary embodiment of the present invention.

FIG. 5 illustrates a further exemplary embodiment of a seat rail according to the present invention in sectional view. As in FIG. 4, in FIG. 5 the seat rail crest 2 and the support structure 4 are connected with each other in an end-to-end configuration of T-form. In contrary to the exemplary embodiment of FIG. 4, in FIG. 5 an additional material having wire form 34 and 36 is provided for. The laser beams or electron beams 44 and 46 are directed onto the side of the support structure of the joint position 6, so that the aluminium of the support structure and/or the additional materials having wire form 34 and 36 are heated. Thereby, the desired deposition of material at the joint position occurs.

The present invention enables in what is thought in an advantageous manner a considerable reduction of a stock removal volume in the titanium region of the seat rail. An aluminium rods press profile or welding profile, which may be used, due to the simple geometry, does not need to be machinably processed, or needs to be machinably processed in the groove region only. Due to the reduced expenditure of work, and due to the reduced demand of expensive titanium material, there results a cost advantage and an easier processing. Moreover, due to targeted application or also due to omitting additional materials, a carrying-off or deposition of material at the joint position can be specifically controlled. Particularly, for the aircraft construction, the present invention allows for an economising of weight, as compared to a complete construction made of titanium.

For example, Ti6Al4V may be used as titanium alloy. As aluminium alloys may be used, for example, AW-6013 T4 and AW-7349/-7055 T76511 or AW-6016 T4.

Figure 6:
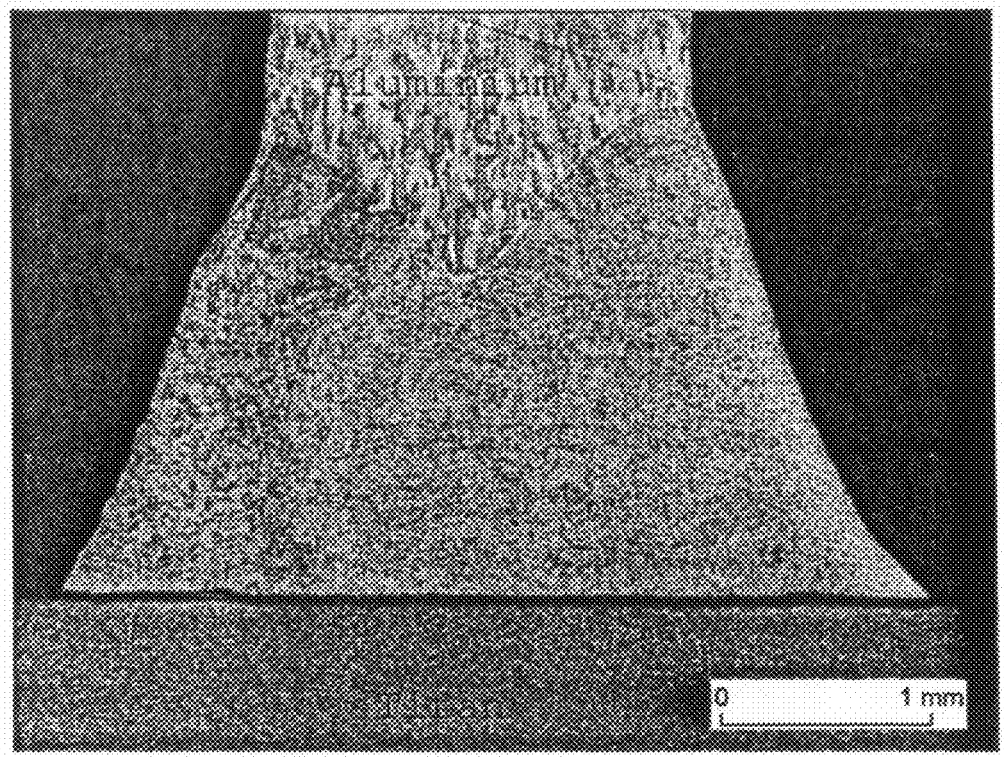
FIG. 6 shows a microscopic image of a laser-joined aluminium-titanium end-to-end joint of T-form, as it may be achieved, for example, in FIG. 5.

FIG. 6 shows a microscopic sectional view of a laser joined aluminium-titanium end-to-end connection of T-form with additional material of wire-form, as for example, schematically illustrated in FIG. 5.

Figure 7:
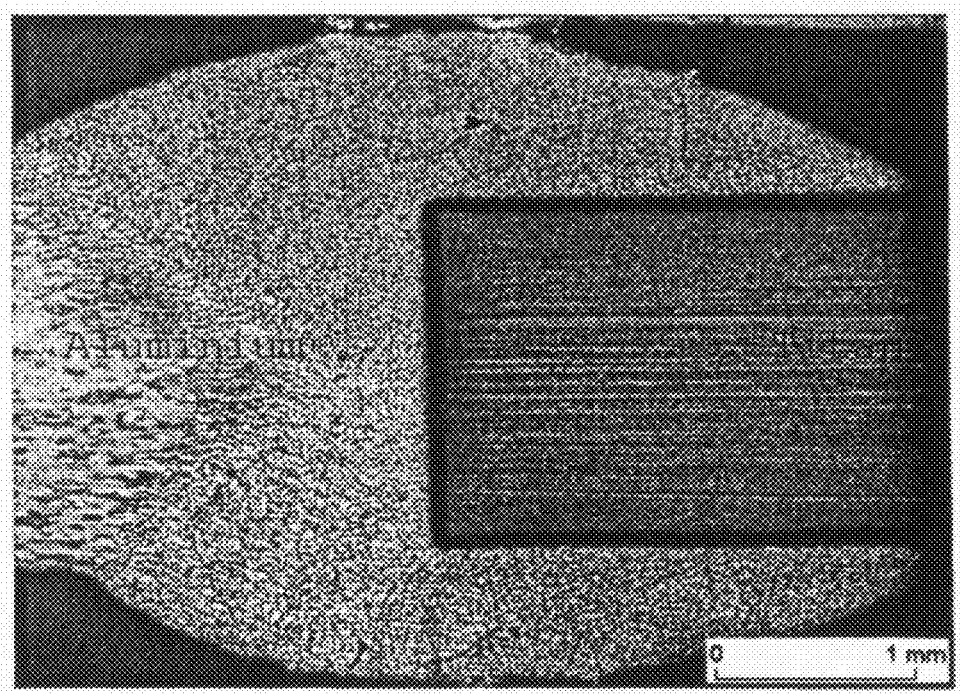
FIG. 7 shows a microscopic image of a laser-joined aluminium-titanium end-to-end joint of I-form, as it may be achieved, for example, in the exemplary embodiment shown in FIG. 3.

FIG. 7 shows a microscopic view of a laser joined aluminium-titanium end-to-end connection of I-form, like it is, for example, schematically illustrated in FIG. 3.

It can be seen from FIGS. 6 and 7 that the materials are well connected at the joining line. The joining position or welded joint is shaped symmetrically. The connection is quite homogeneous in an advantageous manner. Advantageously, the titanium is not melted.

The present invention can particularly favourably be applied in the field of aircraft construction, where the combination of corrosion resistant components with small weight is required. Although the present invention is only described with reference to a seat rail, it must be pointed out that the present joining technology is also applicable to other components.

In addition, it has to be pointed out that "comprising" does not exclude other elements or steps, and that "one" or "a" does not exclude a multiplicity. Further, it is pointed out that features or steps, which are described with reference to one of the above exemplary embodiments, can also be applied in combination with other features or steps of other above described exemplary embodiments.

The invention claimed is:

1. A method of manufacturing a seat rail for an aircraft passenger seat, the seat rail comprising a seat rail crest and a support structure, by joining a first region of the seat rail crest consisting of a titanium material and a second region of the support structure consisting of a first aluminium material for manufacturing the seat rail, the first region having a first area and the second region having a second area, wherein the first and second areas are to be connected with each other, wherein the method comprises:
   arranging the first area and the second area adjacent to one another;
   melting-on a second aluminium material at the first area by supplying heat to the second aluminium material only and by not supplying heat to the seat rail crest;
   activating a surface in the first area of the first region by supplying heat; and
   wherein the heat supply is such that the melted-on second aluminium material wets the activated titanium material and the substance-to-substance bond between the first region and the second region is formed by means of diffusion process which is initiated by a heat flux from the aluminium material toward the titanium material.

2. The method of claim 1,
   wherein the second aluminium material is the first aluminium material of the second region.

3. The method of claim 1, further comprising:
   applying the heat supply to the first area of the first region and the second area of the second region.

4. The method of claim 1, further comprising:
   applying the heat supply to the second area of the second region.

5. The method of claim 1, further comprising:
   supplying the heat by means of a defocused laser beam or electron beam; and
   supplying an inert gas.

6. The method of claim 1, further comprising:
   providing a web in the first area of the first region;
   providing a groove in the second area of the second region;
   inserting the web into the groove;
   providing a thickening comprising the second aluminium material in the second region; and
   wherein the thickening is provided as material pool, for joining the first and second regions.

* * * * *